United States Patent Office 3,265,295
Patented August 9, 1966

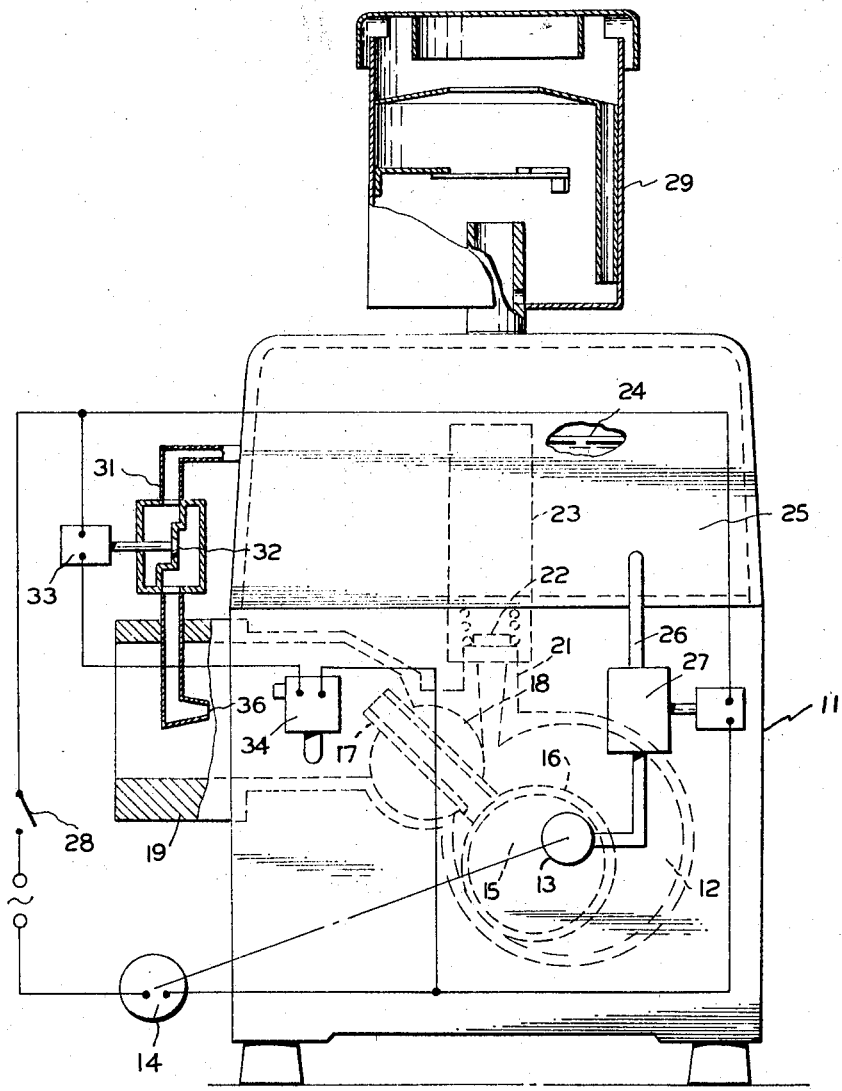

3,265,295
PUMP
RobRoy Cyr, Medfield, Mass., assignor to The New York Air Brake Company, a corporation of New Jersey
Filed July 31, 1964, Ser. No. 386,531
4 Claims. (Cl. 230—207)

This invention relates to lubricating systems for oil-sealed mechanical, vacuum pumps.

In oil-sealed mechanical pumps both gravity lubricating systems and positive pressure systems have been used. In the usual gravity system, oil is admitted from an elevated reservoir into the interior of the pump through the bearing clearances. The reservoir is at atmospheric pressure, and the oil is forced into the pump by the liquid head and the difference between atmospheric pressure and the sub-atmospheric pressure (vacuum) existing in the pump. Such a system is satisfactory provided an adequate pressure differential is maintained or is quickly created on start-up. If the pump is used to evacuate a large volume or if a substantial amount of gas leaks into or is generated within the evacuated space, considerable time may elapse after start-up before a pressure differential is developed which is adequate to force oil through the bearings. This can result in serious damage because of inadequate lubricant flow. In the past the use of a lubricant pump acting to provide a positive lubricant supply was believed necessary in a system where the pump-down time was long.

According to the present invention, a separate lubricant supply connection running directly from the reservoir to the pumping chamber via the suction connection is provided. This lubricant supply connection is controlled by a pressure responsive valve which is open when the pump is operating and the pressure at the pump's inlet is above a certain value. Flow through this connection may be augmented on pump start-up by the high gas flow. This stems from the fact that the high initial gas flow through the oil separator will create a somewhat higher back pressure on the oil in the reservoir. The pumped air is also used as motive fluid in an ejector to assist in the delivery of oil from the reservoir into the interior of the vacuum pump. The assistance to lubricant flow by the two devices just mentioned becomes less as the suction pressure and the pumping speed decrease. However, the falling suction pressure will increase the rate of lubricant supply through the bearing clearance and through the auxiliary oil line.

A preferred embodiment of the invention is shown in the accompanying drawing, certain parts being shown in section.

The pump comprises a housing 11 which incases pumping chamber 12 concentric with the axis of shaft 13. Motor 14 drives the shaft 13. An eccentrically mounted cam 15 and its encircling strap 16 are located in pumping chamber 12. A valve slide 17 projects radially from strap 16 through a guideway in pin 18. The pump's suction connection appears at 19. The discharge connection is at 21. A lightly loaded check valve 22 prevents back-flow into the pump. A pipe 23 extends upward from discharge connection 21 into the air space above the level of liquid 24 in lubricant reservoir 25. A lubricant supply line 26 extends downward from the reservoir 25 to the bearings of shaft 13. Oil flows through this line and enters the pumping chamber 12 through the bearing clearance. A solenoid-actuated valve 27 controls the flow of oil through this line. The solenoid actuator is energized so as to open valve 27 whenever switch 28 is closed to cause operation of motor 14. Air is discharged from above the reservoir 25 through an oil separator 29 of conventional form.

The apparatus described to this point is known in the art and no claim is made to this structure per se.

A second lubricant supply line 31 extends from a point below the level of liquid in reservoir 25 downward into the suction connection 19. This line 31 has a nozzle 36 at its lower end. This nozzle is directed in the direction of air flowing to the pumping chamber 12. A solenoid-actuated valve 32 controls flow through this line 31. The solenoid actuator 33 is electrically connected in series with a pressure switch 34. Pressure switch 34 responds to the pressure in the suction connection 19. It is closed and permits energization of solenoid 33 to open valve 32 when the pressure in the suction connection is above a certain amount. When the pump is idle, both valve 27 and valve 32 are closed, as otherwise the pump might be flooded with lubricant. When motor switch 28 is closed, valve 27 will open. Valve 32 will also open unless the pressure in the suction connection is below a certain amount.

Ordinarily at start-up the suction pressure will be quite high and valve 32 will open. Because of the low difference between the suction pressure and atmospheric pressure, the flow of lubricant through the bearing clearance will be quite small and inadequate to lubricate and seal the pump. Connection 31 is not restricted and lubricant will flow through it because of the elevation of reservoir 25. Flow through connection 31 is augmented in two ways which are initially effective and then become ineffective. This flow is augmented somewhat by the fact that the flow rate in the suction connection 19 and through the pump is, at start-up, quite high. The separator 29 will cause a back pressure to be developed when the flow rate is high so that the pressure above the liquid in reservoir 25 will be superatmospheric. This high rate of gas flow through the pump will also cause nozzle 36 to operate as an ejector and draw lubricant from the reservoir 25. After valve 32 has closed, the lubricant flow through line 26 will be adequate to lubricate and seal the pump.

The inventive concept is not limited to the illustrated apparatus and no limitation to this apparatus is implied except as is expressly stated in the appended claims.

What is claimed is:

1. In an oil-sealed mechanical vacuum pumping means, of the type including a lubricant reservoir open to atmosphere and elevated with respect to the pumping means and a lubricating line leading from said reservoir to the interior of the pumping means through its bearing clearances, the improvement comprising:
  (a) a connection from said reservoir directly to the suction connection of the pumping means and through which lubricant may flow by gravity;
  (b) valve means in said connection and controlling the flow of lubricant therethrough,
  (c) pressure responsive means closing said valve when pressure in the suction connection falls below a predetermined value.

2. The combination defined in claim 1 in which the pumping means discharges into the air space in the reservoir above the level of lubricant therein; and an oil separator through which gas discharged by the pumping means passes to atmosphere, said separator creating a back-pressure in said air space when the flow rate is high.

3. The combination defined in claim 1 and a nozzle at the end of said connection which is in the suction connection, said nozzle defining an oil path parallel with the direction of gas flow, said gas flow inducing flow of lubricant through said connection.

4. The combination defined in claim 1 in which said valve means comprises:
 (a) a valve;
 (b) a solenoid actuator therefor;
 (c) a pressure actuated switch; and
 (d) circuit means including a source of electric potential, a main switch, said solenoid actuator and the pressure actuated switch connected in series with one another.

References Cited by the Examiner
UNITED STATES PATENTS

| | | | |
|---|---|---|---|
| 2,285,426 | 6/1942 | Freeman | 230—206 |
| 2,301,034 | 11/1942 | Freeman et al. | 230—206 X |

ROBERT M. WALKER, *Primary Examiner.*